Jan. 19, 1954     M. B. POLLARD     2,666,426
PORTABLE BARBECUE AND RANGE
Filed Aug. 4, 1950
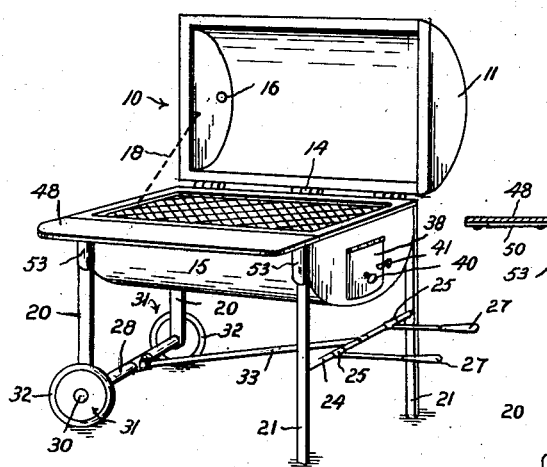
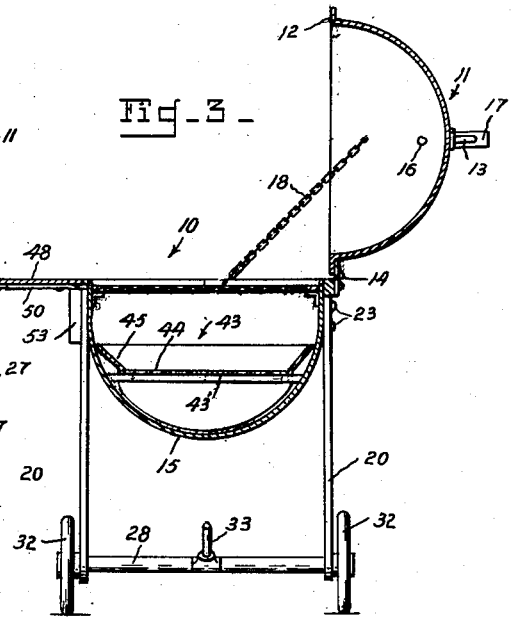
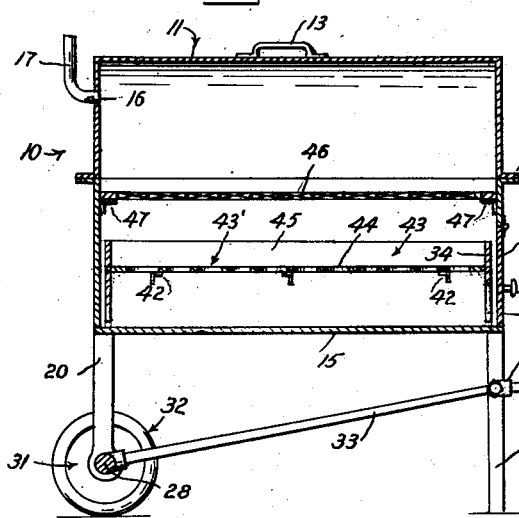
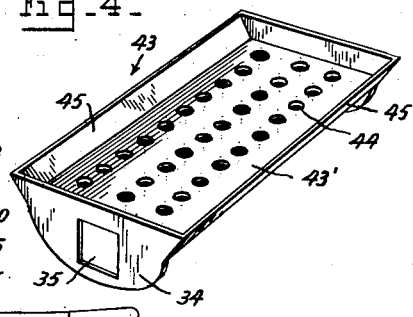
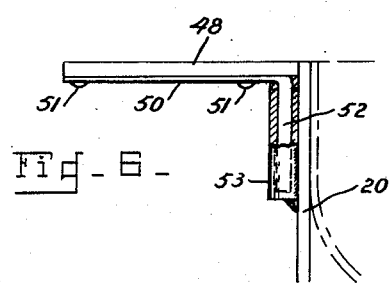
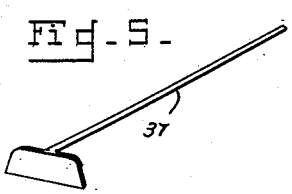
Inventor
Maurice B. Pollard
By
Attorney Patented Jan. 19, 1954

2,666,426

UNITED STATES PATENT OFFICE 2,666,426

PORTABLE BARBECUE AND RANGE

Maurice B. Pollard, Pampa, Tex.

Application August 4, 1950, Serial No. 177,680

1 Claim. (Cl. 126—25)

This invention relates to a portable barbecue and range and has for an object to provide an improved portable barbecue especially intended for home and backyard use.

The further object of this invention is to provide an improved portable barbecue which also acts as a range and a charcoal broiler.

A still further object of this invention is to provide an improved portable barbecue having a top cover or shell which is hinged and may be used to cover the barbecue grill while broiling or may be left open while cooking, thus providing both a closed range or an open barbecue pit.

Still a further object of this invention is to provide a combination portable barbecue pit and range provided with wheels at one end and handle members at the other end so that it may be easily moved about in the manner of a wheelbarrow so as to bring it to the desired location for use.

Still a further object of this invention is to provide a portable barbecue having a removable serving shelf readily adjacent to the barbecue grill thereby providing a handy place for the raw food as well as for the cooked food.

Still a further object of this invention is to provide a barbecue and range having a readily removable grill for supporting the food during cooking and also having a removable burner and removable spark pan for supporting the burner in suitable position within and spaced from a barbecue shelf.

Still a further object of this invention is to provide a barbecue having a bottom shelf supported on legs removably bolted thereto and itself providing a support for the spark pan, the burner, and the grill, and having a top closure shell hinged thereto, such closure shell being provided with an angularly adjustable vent or chimney for providing a draft at one end, the bottom shell being provided with a clean-out door at the other end which may be left somewhat open to provide a draft under the burner pan.

With the foregoing and other objects in view as will hereinafter become apparent, this invention provides the construction, combination and arrangements of parts hereinafter set forth, claimed and disclosed in the accompanying drawing, wherein Fig. 1 is a perspective view of the barbecue and range of this invention, the top shell being in open position.

Fig. 2 is a longitudinal section view with the top shell in closed position.

Fig. 3 is a transverse sectional view with the top shell in open position.

Fig. 4 is a perspective view of the spark pan and burner.

Fig. 5 is a perspective view of a coal rake and,

Fig. 6 is a detailed view of the serving board and its detachable attachments.

There is shown at 10 the portable barbecue, range, and charcoal broiler of this invention, which includes a top shell 11 flanged at 12 and provided with a handle 13 for opening and closing it about its hinges 14 on the bottom shell 15. The top shell 11 is provided with a vent 16 through one end side thereof, the vent 16 having an elbow pipe 16 thereon connected thereto by a slipjoint so that it is either readily removable or adjustable to any desired angle for providing draft when the top shell 11 is in closed position on the bottom shell 15, a chain 18 being provided between the bottom shell 15 and top shell 11 for supporting top shell 11 in open position as shown in Figures 1 and 3.

The bottom shell 15 is supported on front legs 20 and rear legs 21 removably secured thereto as by bolts and nuts 23, the legs being preferably made of angle iron. The back legs 21 are secured together by a brace rod 24 bolted thereto and welded to the back brace 24 a slight distance from each end are threaded collars 25 into which are screwed rod sections having rubber grips 27 thus providing handles for moving the barbecue 10. Front legs 20 are provided with a front brace 28 bolted thereto, and welded on the bottom of the brace 28 at each end thereof is a steel rod 30 extending therefrom and providing axles 30 on which are mounted ball bearing disc-type wheels 31 having rubber tires 32. The overall length of the front legs 20 and the radius of the wheels 31 and its tires 32 is substantially equal to the overall length of the back legs 21 whereby the barbecue is supported in a horizontal position when at rest on the legs. Bolted between the front brace 28 and the rear brace 24 and angling upward toward such rear brace is a center brace 33 thus providing a firm and rigid support to the legs at the ends of the shell 15.

The bottom shell 15 acts as a container and support for one end 34 of a burner grate 43 and has an opening 35 both for providing a draft when the invention is used as a range and for raking out the ashes through a doorway in the end of the shell 15 by means of the coal and ash rake 37. A doorway is provided in the end of shell 15 with a hinged door 39 having a handle knob 40 for opening same and a hasp 41 on one side thereof for keeping it closed when desired. Spot welded to the inside of bottom shell 15 are burner supports 42 on which is removably supported the burner grate 43 consisting of a metal sheet having a plurality of staggered holes 44 for providing a draft thereto. The side edges of the burner plate 43 are flanged upwardly at a forty-five degree angle as at 45, thereby confining the burning wood charcoal or coals on the burner 43 so that the fire cannot touch the sides of the bottom shell 15. The burner grate 43 may be easily lifted out for cleaning out the ashes. A barbecue grill or broiler 46 consisting of an expanded metal mesh rests on longitudinal angle iron supports 47 welded within the shell 15 a slight distance below its top edge so as to removably support the grill 46 thereon.

A serving board 48 is provided for removable attachment along the open side of the bottom shell 15. In order to support this board 48 in position, it is provided on the bottom at each end thereof with a section of strap iron 50 having securing wood screws 51 therethrough and having a rod 52 welded to the end. Tube sections 53 of a length and diameter to receive the supporting rods 52 are spot welded to the front leg 20 and back leg 21 that are on the open side of the shell 15 and opposite the hinged side. As will be apparent, the serving board 48 may be easily removed by lifting it, thereby withdrawing its supporting rods 52 from the supporting tubes 53.

In operation, the legs and braces may be readily removed and attached by means of their bolts and nuts thereby enabling the portable barbecue, range and charcoal grill to be readily knocked down if needed for transportation in the trunk of an automobile as when travelling to a picnic ground. However, it may be kept for home use in the backyard in completely assembled position and stored in one's cellar or garage and wheeled out by means of the handle grips 27 and wheels 31 to any desired location. When used as a barbecue or charcoal broiler, the top shell 11 is opened by means of its handle 13 and supported in an open position by means of the chain 18. A fire is built on the burner grates 43 using charcoal, coal or wood as may be convenient. Then, after the fire has burned itself down to hot coals, the broiler grill 46 is placed thereover and the serving board 48 is readily placed in position. The raw food may be placed on the serving board 48 whence it is removed to the broiling grill 46 until it is broiled or grilled and then placed back on the serving board ready for consumption.

To use the invention as a range, pots or pans are placed on the broiler grill 46 and the top shell 11 is closed down thereover by means of the handle lid 13, thus enabling one to bake, cook, or roast as may be desired. In this position the vent angle pipe 17 is turned to the desired angle to create a draft and the door 38 is propped open so as to create an air supply within the closed range. When the baking or roasting is finished, the top shell 11 is readily opened by means of its handle 13 and it may be then used in open position for broiling.

When finished, the ashes may be raked out by means of the rake 38 or the broiler grill and burner grate may be removed for dumping out the ashes, using tongs if necessary if it is still hot, and then allowed to cool before being put away or knocked down if necessary.

While the preferred form of this invention has been shown and described, it will be understood that this invention is not restricted to the particular details of construction and arrangement hereinbefore set forth but that changes in such detail of construction may be made within the scope of what is hereinafter claimed.

Having thus set forth and disclosed the nature of this invention, what is claimed is:

A portable barbecue and range comprising a barbecue bottom shell and a range top shell hinged to said bottom shell, means for supporting said top shell in open position relative to said bottom shell, leg supporting means removably attached to said bottom shell, said shells each comprising a half cylindrical member closed at both ends, said leg supporting means including wheel means and handle means, a burner grate, means within said bottom shell for removably supporting said burner grate in spaced relation thereto, said grate support means including a plurality of transverse angle irons welded within said bottom shell, a broiler grill comprising an expanded metal sheet, means for supporting said broiler grill within said bottom shell spaced substantially above said burner grate support means, said broiler grill supporting means comprising angle irons welded longitudinally within said bottom shell, a draft door at one end of said bottom shell, and a vent through the opposite end of said top shell, said vent tube including an elbow pipe slip-jointed thereon for angular adjustment.

MAURICE B. POLLARD.

References Cited in the file of this patent

UNITED STATES PATENTS

| Number | Name | Date |
|---|---|---|
| D. 144,431 | Talley | Apr. 9, 1946 |
| 282,235 | Stern | July 31, 1883 |
| 323,665 | Gordon | Apr. 4, 1885 |
| 995,705 | Neel | June 20, 1911 |
| 1,650,529 | Montgomery | Nov. 22, 1927 |
| 2,080,109 | Brennan | May 11, 1937 |
| 2,164,835 | Pearson | July 4, 1939 |
| 2,325,828 | Betts | Aug. 3, 1943 |
| 2,419,344 | Eggleston | Apr. 22, 1947 |
| 2,484,239 | Moon | Oct. 11, 1949 |
| 2,541,528 | McAvoy | Feb. 13, 1951 |
| 2,556,365 | McKnight | June 12, 1951 |